United States Patent [19]

Bauer et al.

[11] Patent Number: 5,783,710
[45] Date of Patent: Jul. 21, 1998

[54] BENZOTHIOXANTHENE DYES, THEIR PREPARATION AND THEIR USE

[75] Inventors: Wolfgang Bauer, Maintal; Dieter Baumgart, Egelsbach; Walter Zöller, Klingenberg, all of Germany

[73] Assignee: Hoechst Aktiengesellschaft, Frankfurt, Germany

[21] Appl. No.: 814,483

[22] Filed: Mar. 10, 1997

[30] Foreign Application Priority Data

Mar. 11, 1996 [DE] Germany ............... 196 09 338.4

[51] Int. Cl.$^6$ .............. C07D 335/04; G03C 1/725; B41J 2/175; C09B 67/28
[52] U.S. Cl. .............. 549/24; 430/343; 347/88; 8/650; 260/DIG. 38
[58] Field of Search .............. 549/24; 514/432; 430/343; 347/88; 8/650; 260/DIG. 38

[56] References Cited

U.S. PATENT DOCUMENTS 4,315,865  2/1982  Hoyer et al. .................. 549/24
5,415,669  5/1995  Buhler et al. .................. 8/644

FOREIGN PATENT DOCUMENTS 1113487  3/1966  United Kingdom.

*Primary Examiner*—Deborah C. Lambkin
*Attorney, Agent, or Firm*—Susan S. Jackson

[57] ABSTRACT

The present invention relates to benzothioxanthene dyes of the formula I,

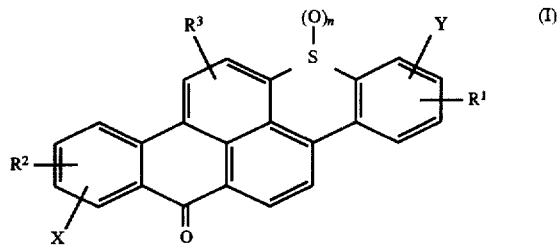

in which $R^1$ is $SO_3^\ominus M^\oplus$ or $SO_2NR^4R^5$, $R^2$ and $R^3$ independently of one another are hydrogen, $SO_3^\ominus M^\oplus$ or $SO_2NR^4R^5$ and X, Y, n, $R^4$, $R^5$ and $M^\oplus$ are as defined in claim 1, to their preparation and to their use, especially in inks and recording liquids.

15 Claims, No Drawings

BENZOTHIOXANTHENE DYES, THEIR PREPARATION AND THEIR USE

The present invention relates to novel benzothioxanthene dyes of the formula I,

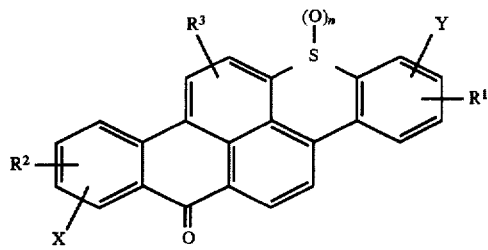

in which at least one of the radicals $R^1$, $R^2$ and $R^3$ is a sulfonic acid or sulfonate group or a sulfonamide group, to their preparation and to their use, especially in inks and in recording liquids for the inkjet printing process, and to such recording liquids.

Inks, writing liquids and marking liquids—in general, recording liquids—consist in principle of one or more soluble dyes in solution in a solvent, for example water, or in a solvent mixture. The solution generally also includes auxiliaries, examples being surface-active substances, moisture retention agents and preservatives. Particular requirements are placed on recording liquids to be used in the inkjet printing process, a contactless printing process in which droplets of the recording liquid are sprayed from one or more nozzles onto the substrate that is to be printed. In order to obtain prints of high quality, i.e. high definition and clarity, it is necessary, for example, to meet specific requirements in terms of purity, freedom from particles, viscosity, surface tension or corrosiveness of the recording liquid, which in turn dictate specific requirements regarding the properties of the dyes that are used to prepare the recording liquid. For instance, the dyes must in particular be of high solubility so that there is no deposition of precipitates or no crusting on the nozzle.

In addition, however, the dyes should of course also be as strong as possible in color and have high fastness properties, so that the prints are stable.

In many cases, however, recording liquids for the inkjet printing process, and/or the dyes present in such liquids, still have a range of disadvantages, such as inadequate storage stability of the recording liquids, leading to the deposition of dye crystals, to the blockage of nozzles and to printed images of poor definition, or inadequate dye fastness properties, which limit the fitness for use of the prints that are obtained. In particular, for instance, the red dyes that are employed in multicolor printing in the prior art (see, for example, P. Gregory, High-Technology Applications of Organic Colorants, Plenum Press, pp. 197–200 (1991)), for example those of the type C.I. Acid Red 249 of the formula II,

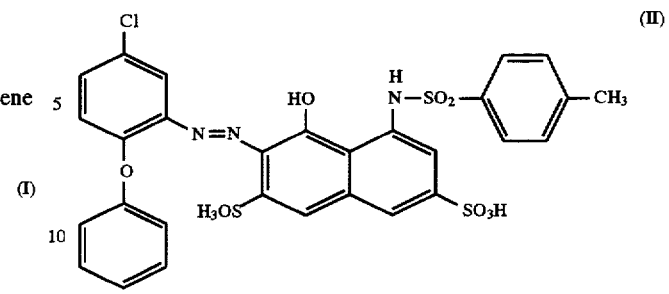

are of inadequate light fastness and document fastness, and there is a need for dyes and recording liquids for red print with improved properties.

Benzothioxanthene dyes of the formula III,

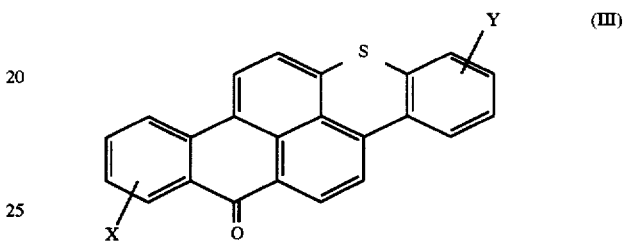

in which X and Y are, for example, hydrogen, halogen, alkyl or alkoxy, are known, an example being C.I. Solvent Orange 63, i.e. the compound of the formula III in which X and Y are hydrogen. The dyes of the formula III are used for dyeing and printing textile fiber materials, for example those comprising polyesters, but in particular are used for coloring plastics, such as polystyrene, polymethacrylates, polyolefins or polycarbonates, for example. The hexacyclic compounds of the formula III would, in accordance with systematic nomenclature, be called anthrathioxanthenes or anthracenothioxanthenes; however, they and other dyes containing the tetracyclic benzothioxanthene structure are commonly referred to as benzothioxanthene dyes. Dyes of the formula III are described, for example, in DE-B1 293 939, U.S. Pat. No. 3,828,072, U.S. Pat. No. 5,280,128 and U.S. Pat. No. 5,415,669. Sulfonic acid derivatives of the compounds of the formula III have not as yet been described.

It has surprisingly now been found that the introduction of one or more sulfonic acid and/or sulfonate groups or sulfonamide groups into the compounds of the formula III produces dyes which are outstandingly suitable as red dyes for inkjet printing and lead to prints having very high light fastness.

The present invention provides benzothioxanthene dyes of the formula I,

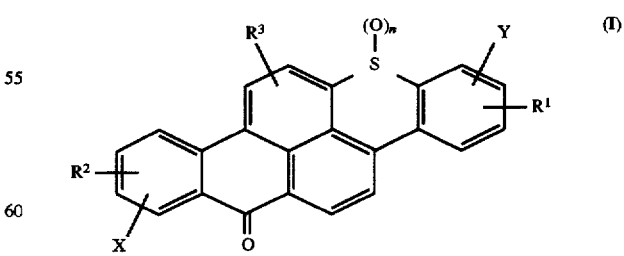

in which $R^1$ is $SO_3^\ominus M^\oplus$ or $SO_2NR^4R^5$;

$R^2$ and $R^3$ independently of one another are hydrogen, $SO_3^\ominus M^\oplus$ or $SO_2NR^4R^5$;

$R^4$ is hydrogen, $(C_1-C_{22})$-alkyl, $(C_3-C_7)$-cycloalkyl, aryl, heteroaryl, aryl-$(C_1-C_6)$-alkyl, hydroxy-$(C_1-C_4)$-alkyl or carboxy-$(C_1-C_4)$-alkyl;

$R^5$ is hydrogen, $(C_1-C_{22})$-alkyl, $(C_3-C_7)$-cycloalkyl, aryl-$(C_1-C_6)$-alkyl, hydroxy-$(C_1-C_4)$-alkyl, dihydroxy-$(C_1-C_4)$-alkyl, carboxy-$(C_1-C_4)$-alkyl, dicarboxy-$(C_1-C_6)$-alkyl, (amino)-(carboxy)-$(C_1-C_6)$-alkyl, sulfo-$(C_1-C_6)$-alkyl, amino-$(C_1-C_6)$-alkyl, $(C_1-C_4)$-alkylamino-$(C_1-C_6)$-alkyl, (di-$((C_1-C_4)$-alkyl)amino)-$(C_1-C_6)$-alkyl or the residue of an amino acid which is formally obtained by removing the amino group from the amino acid molecule, or $R^4$ and $R^5$, together with the nitrogen atom to which they are attached, form a 5- to 7-membered heterocyclic ring;

$M^{\oplus}$ is a cation;

X is hydrogen, chlorine or bromine;

Y is hydrogen, chlorine, $(C_1-C_4)$-alkyl or $(C_1-C_4)$-alkoxy; and n is 0, 1 or 2.

Alkyl groups can be straight-chain or branched, either when substituted or when present as substituents on other groups, for example alkoxy groups or alkylamino groups. Examples of $(C_1-C_4)$-alkyl groups are methyl, ethyl, n-propyl, i-propyl, n-butyl, i-butyl, sec-butyl and tert-butyl, for $(C_1-C_6)$-alkyl groups additionally n-pentyl, i-pentyl, n-hexyl, i-hexyl, for $(C_1-C_{22})$-alkyl additionally n-heptyl, i-heptyl, n-octyl, i-octyl, tert-octyl, 2-ethylhexyl, nonyl, decyl, isodecyl, dodecyl, tetradecyl, hexadecyl, octadecyl, eicosyl, docosyl. In alkyl groups it is also possible for one or more carbon atoms to be replaced by oxygen atoms or nitrogen atoms; in other words, for example, it is also possible for groups such as methoxyethyl, methoxyethoxyethyl, butoxyethyl or 3-(2-ethylhexoxy) propyl or ethylaminoethyl or ethylaminoethylaminoethyl to be present. The term alkyl groups as used herein also refers to alkyl groups containing double bonds, i.e. alkenyl groups, for example allyl groups or unsaturated fatty alkyl radicals.

Examples of $(C_3-C_7)$-cycloalkyl are cyclopropyl, cyclobutyl, cyclopentyl, cyclohexyl and cycloheptyl. A preferred cycloalkyl radical is cyclohexyl.

Aryl groups have preferably 6 to 14 aromatic carbon atoms and can be substituted by one or more groups, for example $(C_1-C_{22})$-alkyl groups and/or $(C_1-C_{22})$-alkoxy groups. Examples of aryl groups are phenyl, 1-naphthyl, 2-naphthyl, anthracenyl, phenanthrenyl, biphenylyl, fluorenyl. A preferred aryl group is phenyl, especially unsubstituted phenyl and phenyl which is substituted by a $(C_1-C_{22})$-alkyl group or a $(C_1-C_{22})$-alkoxy group.

Heteroaryl groups are preferably mono- or bicyclic radicals with 5- and/or 6-membered rings, which as heteroatoms comprise, in particular, 1, 2 or 3 nitrogen and/or oxygen and/or sulfur atoms and can be substituted, for example, one or more times by $(C_1-C_{22})$-alkyl-and/or $(C_1-C_{22})$-alkoxy and/or oxo groups. Examples of heteroaryl are 2-, 3- and 4-pyridyl, 2-imidazolyl, 2-thiazolyl, 2-benzimidazolyl, 2-benzothiazolyl and 2-oxobenzimidazol-5-yl.

Examples of arylalkyl radicals are phenylethyl and, in particular, benzyl. Examples of hydroxyalkyl are 2-hydroxyethyl, 2-hydroxypropyl, 3-hydroxypropyl, 4-hydroxybutyl, 2-hydroxy-2-methylpropyl. Examples of carboxyalkyl are carboxymethyl, 1-carboxyethyl, 2-carboxyethyl, 1-, 2- and 3-carboxypropyl, 1-carboxy-2-methylpropyl. Carboxyl groups can generally be present in the form of the free acids, i.e. as COOH groups, and in the form of salts, i.e. as carboxyl groups $COO^{\ominus}M^{\oplus}$, in which $M^{\oplus}$ is a cation other than hydrogen. Corresponding comments apply to sulfo groups.

Examples of aminoalkyl radicals, and aminoalkyl radicals which are alkylated on the nitrogen, are 2-aminoethyl, 2- and 3-aminopropyl, 2-dimethylaminoethyl, 2-diethylaminoethyl, 3-dimethylaminopropyl and 6-aminohexyl. Examples of (amino)(carboxy)alkyl radicals are 4-amino-4-carboxybutyl, 5-amino-5-carboxypentyl, 4-amino-1-carboxybutyl and 5-amino-1-carboxypentyl. Residues of amino acids which are obtained formally by removing the amino group from the amino acid molecule are derived, for example, from glycine valine, alanine, serine, cysteine, aspartic acid, asparagine, glutamic acid, glutamine, lysine, ornithine, phenylalanine, histidine, proline, tyrosine, arginine.

Where $R^4$ and $R^5$, together with the nitrogen atom to which they are attached, form a heterocyclic ring, this ring can comprise further heteroatoms, especially a further nitrogen or oxygen atom, and can be substituted one or more times on carbon atoms and/or nitrogen atoms, for example by $(C_1-C_6)$-alkyl radicals or hydroxy-$(C_1-C_4)$-alkyl radicals. Examples of heterocyclic rings are pyrrolidine, piperidine, perhydroazepine, morpholine, piperazine, 4-methylpiperidine, 4-hexylpiperidine, 2,6-dimethylpiperidine, 3,3-dimethylmorpholine, 4-methylpiperazine, 4-(2-hydroxyethyl)piperazine.

The cations represented by $M^{\oplus}$ may comprise a singly charged ion or an equivalent of a doubly or multiply positively charged ion. A cation represented by $M^{\oplus}$ can be organic or inorganic. These and the following explanations of $M^{\oplus}$ apply to the cations present in the sulfonate radicals represented by $R^1$, $R^2$, $R^3$, and equally to cations which are present in carboxyl and sulfo groups in the radicals $R^4$ and $R^5$ if these are present in salt form. If in the novel dye of the formula I there are two or more cations $M^{\oplus}$, then in each case these can all be identical, partly identical or all different. If, for example, 2 or 3 of the radicals $R^1$, $R^2$, $R^3$ are sulfonate groups, then the cations in these groups can be identical or different. Corresponding comments apply if, on their own or in addition to such sulfonate groups, carboxyl and/or sulfo groups in the salt form are present. In the compounds of the formula I it is also possible for inorganic and organic cations to be present alongside one another. The selection of the cations in each individual case depends on the intended use of the respective compounds.

Particularly suitable inorganic cations are alkali metal and alkaline earth metal ions and the unsubstituted ammonium ion, and also the hydrogen ion. Where one, more or all cations are the hydrogen ion, then the compounds of the formula I, or the respective sulfonate and/or carboxylate groups, are present in the form of the free acids, not as salts. The compounds with free acid functions are also provided by the present invention.

Examples of alkali metal ions are the lithium, sodium, potassium, rubidium and cesium ion; examples of alkaline earth metal ions are the magnesium, calcium, strontium and barium ion. Preferred inorganic cations, in addition to the hydrogen ion, are the ammonium ion and the lithium, sodium, potassium, magnesium, calcium and barium ion; particularly preferred inorganic cations are the lithium, the potassium and the sodium ion.

Particularly suitable organic cations are substituted ammonium ions and cations derived from nitrogen heterocycles, and also quaternary phosphonium ions. The ammonium ions may be primary, secondary, tertiary or quaternary ammonium ions, and the organic radicals present therein, for example alkyl, alkenyl, aryl or aralkyl radicals, can be identical or different and can be unsubstituted or substituted. The ammonium ions may also be derived from compounds having a plurality of amino functions, for example from di-, tri- or tetra-amines. In one such case it is possible for all, some or only one of the amino functions to be present as ammonium ions; it is therefore also possible for multiply charged ammonium ions to be present. Nitrogen heterocycles from which suitable cations are derived can be aromatic, partially saturated or completely saturated, and in addition to the positively charged nitrogen atom(s) may also include further heteroatoms, for example uncharged nitrogen atoms or oxygen atoms. Examples of nitrogen heterocycles that may be mentioned are pyrrolidine, piperidine, piperazine or morpholine, all of which can also be substituted on the nitrogen, and pyridine or imidazole. The cations may be produced from the heterocycles, formally, by addition of a proton or, for example, of an unsubstituted or substituted alkyl or aralkyl radical, or by exhaustive alkylation.

Preferred organic cations are ammonium ions and phosphonium ions of the formula IV,

in which Z is nitrogen or phosphorus and $R^6$, $R^7$, $R^8$ and $R^9$ independently of one another are $(C_1-C_{22})$-alkyl, which can be substituted by one or more hydroxyl groups and/or 2-hydroxyethoxy groups and in which carbon atoms can be replaced once or more by hetero-groups such as oxygen atoms or nitrogen atoms and in which the aliphatic system can also be interrupted by aryl units and/or substituted by aryl groups; or represent $(C_3-C_7)$-cycloalkyl, which can also be substituted once or more by $(C_1-C_4)$-alkyl and/or hydroxyl groups and in which carbon atoms can be replaced once or more by hetero-groups such as oxygen or nitrogen atoms; or represent unsubstituted or mono- or polysubstituted aryl; or represent unsubstituted or mono- or polysubstituted heteroaryl; or represent $-(CH_2-CH_2-O-)_r-R^{10}$, in which $R^{10}$ is hydrogen or $(C_1-C_4)$-alkyl and r is a number from 1 to 5; and, if Z is nitrogen, alternatively represent hydrogen; and in which 2 or 3 of the radicals $R^6$, $R^7$, $R^8$, $R^9$, together with the atom Z to which they are attached, can also form a heterocyclic ring system which can be unsaturated or saturated and can also contain other hetero-groups and/or can be substituted. The above comments, for example regarding alkyl, cycloalkyl, aryl and heteroaryl radicals, apply correspondingly here.

The radicals $R^1$, $R^2$ and $R^3$ and also X and Y can be in any desired positions of the molecule; the pictorial representation in the formula I is not to be understood as meaning that the radicals can be attached only to specific rings or specific carbon atoms. In the case of preparation in accordance with the process described below, starting from the compounds of the formula III, the positions of the radicals $R^1$, $R^2$ and $R^3$ depend on the positions of radicals X and Y and on the reaction conditions, and in many cases mixtures of compounds of the formula I are also produced which may differ in the positions of the radicals $R^1$, $R^2$, $R^3$ and which may also differ in the number of sulfonic acid and/or sulfonate groups or sulfonamide groups in the molecule. In a technical-grade sample of a dye of the formula I there may be a plurality of individual compounds of the formula I having different substitution patterns. In a macroscopic sample of this kind it is also possible for the analytically determined number of a group, for example the number of sulfonate groups or sulfonamide groups, present per hexacyclic framework in the formula I to adopt nonintegral values. Both structurally uniform individual compounds and mixtures of arbitrary composition are provided by the present invention.

Preferably, the number of radicals $R^1$, $R^2$ and $R^3$ which are identical or different groups $SO_3^{\ominus}M^{\oplus}$ or $SO_2NR^4R^5$ is two or three. With particular preference, the number of radicals $R^1$, $R^2$ and $R^3$ which are identical or different radicals $SO_3^{\ominus}M^{\oplus}$ or $SO_2NR^4R^5$ is two.

$R^4$ is preferably hydrogen, $(C_1-C_{22})$-alkyl, hydroxy-$(C_1-C_4)$-alkyl or carboxy-$(C_1-C_4)$-alkyl. $R^5$ is preferably hydrogen, $(C_1-C_{22})$-alkyl, hydroxy-$(C_1-C_4)$-alkyl, carboxy-$(C_1-C_4)$-alkyl, dicarboxy-$(C_1-C_6)$-alkyl, (amino)-(carboxy)-$(C_1-C_6)$-alkyl, amino-$(C_1-C_6)$-alkyl, $(C_1-C_4)$-alkylamino-$(C_1-C_6)$-alkyl or (di-$((C_1-C_4)$-alkyl) amino)-$(C_1-C_6)$-alkyl. It is particularly preferred if $R^4$ is hydrogen and $R^5$ has one of the preferred definitions or if $R^4$ and $R^5$ are hydroxy-$(C_1-C_4)$-alkyl.

$M^{\oplus}$ is preferably ions of sodium, lithium, potassium, magnesium, calcium or barium, the unsubstituted ammonium ion, or ions of the formula IV in which $R^6$, $R^7$, $R^8$ and $R^9$ and also Z have the meanings given above, especially ions of the formula IV in which Z is nitrogen.

X and Y independently of one another are preferably hydrogen; with particular preference, X and Y are both hydrogen.

n is preferably 0.

Preferred compounds of the formula I are those in which one or more of the radicals and/or the number n have preferred meanings. Particular preference is given to compounds of the formula I in which two or three, especially two of the radicals $R^1$, $R^2$ and $R^3$ are identical or different groups $SO_3^{\ominus}M^{\oplus}$ or $SO_2NR^4R^5$ and at the same time X is hydrogen, Y is hydrogen and n is 0.

The novel dyes of the formula I can be prepared by first of all converting, in a sulfonation and/or sulfochlorination, the known and conventionally obtainable benzothioxanthene dyes of the formula III,

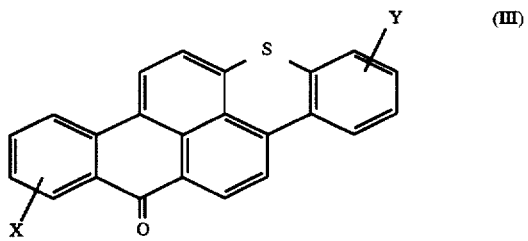

in which X is hydrogen, chlorine or bromine and Y is hydrogen, chlorine, $(C_1-C_4)$-alkyl or $(C_1-C_4)$-alkoxy into sulfonation or sulfochlorination products, respectively, of the formula V

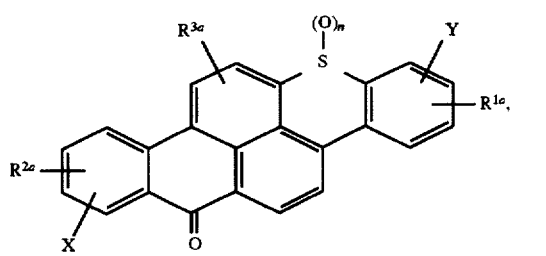

(V)

in which $R^{1a}$ is $SO_3H$ or $SO_2Cl$, $R^{2a}$ and $R^{3a}$ independently of one another are hydrogen, $SO_3H$ or $SO_2Cl$ and n is 0. The sulfonation or sulfochlorination reaction is generally carried out in a manner familiar to the skilled worker, using sulfuric acid and/or oleum and/or chlorosulfonic acid and/or sulfonyl chloride at from −15° C. to 180° C., preferably from 40° C. to 140° C. Oleum is sulfuric acid containing sulfur trioxide or disulfuric acid or else polysulfuric acid. By varying the reaction conditions it is possible to influence the nature, the number and the position of the $SO_3H$ and/or $SO_2Cl$ groups introduced into the starting substance of the formula III.

Where the sulfonation or sulfochlorination reaction produces compounds of the formula V containing $SO_3H$ groups, and where these groups are to be converted first of all into $SO_2Cl$ groups for the subsequent reaction to give the novel compounds of the formula I, this transformation can be accomplished, for example, by means of a subsequent reaction with acid halides, for example thionyl chloride, sulfuryl chloride, phosphorus trichloride, phosphorus pentachloride or phosphorus oxychloride. For the transformation of existing $SO_3H$ groups into $SO_2Cl$ groups, thionyl chloride is preferably used. The transformation is generally conducted in a manner familiar to the skilled worker at from 20° C. to 120° C., preferably from 50° C. to 100° C., for example in an inert solvent or in an excess of the acid halide employed or, with particular expediency, by adding the acid chloride directly to the reaction mixture from the sulfonation or sulfochlorination reaction.

If, on the other hand, the sulfonation or sulfochlorination reaction produces compounds of the formula V containing $SO_2Cl$ groups, and where it is intended to transform these groups into $SO_3H$ groups for the subsequent reaction to form the novel compounds of the formula I, then this transformation can be carried out in a manner familiar to the skilled worker, for example by hydrolysis in the presence of inert inorganic and/or organic bases at, in general, from 0° C. to 120° C., or, with particular simplicity, by heating in water, for example by boiling under reflux.

Where compounds of the formula V are to be isolated this can be done using the customary methods. For example, especially for isolating compounds of the formula V containing $SO_2Cl$ groups, the reaction mixture from the sulfonation or sulfochlorination reaction or the reaction mixture from a reaction carried out to transform $SO_3H$ groups to $SO_2Cl$ groups can in many cases simply be added to water/ice, and the precipitated product can be separated off, for example by filtration or centrifugation. Compounds of the formula V obtained in this way can then be employed, in general directly, in the subsequent reaction to form the novel compounds of the formula I.

Where it is intended to prepare compounds of the formula I in which n is 1 or 2, it is also possible for this purpose, for example, to oxidize those compounds of the formula V in which n is 0 in accordance with the customary methods, familiar to the skilled worker, for the oxidation of thioethers to sulfones or sulfoxides respectively, to form compounds of the formula V in which n is 1 or 2. Examples of oxidizing agents which can be employed are hydrogen peroxide, peracids, such as persulfuric acid or peracetic acid, for example, salts of peracids, for example sodium percarbonate or sodium perborate or potassium persulfate, or other peroxides, for example tert-butyl hydroperoxide. The oxidation is generally conducted in an inert solvent, for example in water or else directly in the reaction mixture present after the sulfonation or sulfochlorination reaction, at from 0° C. to 100° C., preferably from 20° C. to 80° C., and in the presence or absence of oxidation catalysts such as iron ions, vanadium ions or molybdenum ions, for example. Correspondingly, the preparation of novel compounds of the formula I in which n is 1 or 2 can also be carried out by oxidizing novel compounds of the formula I in which n is 0 or by first oxidizing compounds of the formula III and then conducting the sulfonation or sulfochlorination reaction.

In order to obtain novel benzothioxanthene dyes of the formula I with $SO_3^{\ominus}M^{\oplus}$ groups in which $M^{\oplus}$ has a meaning other than $H^{\oplus}$, it is then possible to neutralize $SO_3H$ groups present in the compounds of the formula V using the desired inorganic and/or organic base or bases, with the formation of salts. Neutralization is generally carried out in an inert solvent, for example water. It can be conducted such that, for example, the base or bases is or are metered in, in dissolved form or as pure substance in liquid or solid form, into a solution or suspension of the compound of the formula V, or, conversely, such that the compound of the formula V is metered in dissolved form or as pure substance into a solution or suspension of the base or bases. In this procedure, it is possible to establish a specific pH whose value will be dependent on the specific case.

To neutralize $SO_3H$-containing compounds of the formula V, for example, the following inorganic and organic bases can be employed, alone or in a mixture with one another:

Alkali metal and alkaline earth metal hydroxides, carbonates, bicarbonates and phosphates, for example the hydroxides, carbonates, bicarbonates and phosphates of lithium, sodium and potassium; ammonia, primary, secondary and tertiary amines and nitrogen heterocycles, for example compounds of the formulae VI and VII,

in which $R^4$ and $R^5$ have the meanings given above for the formula I and $R^6$, $R^7$ and $R^8$ have the meanings given above for the formula IV; and quaternary ammonium hydroxides.

Examples of suitable amines are methylamine, ethylamine, n-propylamine, isopropylamine, n-butylamine, isobutylamine, sec-butylamine, dimethylamine, diethylamine, dipropylamine, diisopropylamine, trimethylamine, ethanolamine, diethanolamine, triethanolamine, allylamine, 2-dimethylaminoethylamine, 3-diethylaminopropylamine, dibutyl(2-hydroxy-ethyl) amine, ethylenediamine, 1,2-diaminopropane, 1,3-diaminopropane, 1-amino-2-hydroxypropane, 1-amino-2,3-dihydroxypropane, 1-dimethyl-amino-2,3-dihydroxypropane, N-methyl-N,N-bis(2-hydroxyethyl) amine, N-(2-(2-hydroxyethoxy)ethyl)amine, N,N-bis(2-(2-hydroxyethoxy)ethyl)-amine, N,N,N-tris(2-(2-hydroxyethoxy)ethyl)amine, diethylenetriamine, triethylenetetramine, polyethyleneimine, pyridine, pyrrolidine, N-methylpyrrolidine, N-(2-hydroxyethyl) pyrrolidine, piperidine, N-(2-hydroxyethyl)piperidine, morpholine, N-(2-hydroxyethyl)morpholine, n-pentylamine, isopentylamine, n-hexylamine, n-heptylamine, isoheptyl-amine, n-octylamine, isooctylamine, tert-octylamine, 2-ethylhexylamine, 2,4,4-trimethyl-2-pentylamine, 1,5-dimethylhexylamine, 1-methylheptyl-amine, nonylamine, isononylamine, 3,5,5-trimethylhexylamine, decylamine, dodecylamine, hexadecylamine, stearylamine, coconut fatty amine, oleylamine, 6-ethyl-4-oxadecylamine, 11-methyl-4-oxadecylamine, di-n-butylamine, di-2-ethylhexylamine, diisononylamine, distearylamine, ethyldiisopropylamine, tri-n-butylamine, triisooctylamine, N,N-dimethyl-dodecylamine, N,N-dimethyl coconut fatty amine, benzylamine, dibenzylamine, tribenzylamine, cyclohexylamine, dicyclohexylamine, cyclopentylamine, 1,3-cyclopentandiamine, phenethylamine, styrylamine, N,N-bis(2-hydroxyethyl)dodecylamine, N,N-bis(2-hydroxyethyl)-coconut fatty amine, N,N-bis(2-(2-hydroxyethoxy)ethyl)-coconut fatty amine, tris(3,6-dioxaheptyl)amine, 3-(2-ethylhexyloxy)propylamine, 3-(isononyloxy)propylamine, 3-alkyl- and 4-alkylpiperidines, for example 4-methylpiperidine, 4-hexylpiperidine, alkylpiperazines and alkylmorpholines, especially those having at least 2 carbon atoms in the alkyl radical, for example N-ethylmorpholine, N-butylmorpholine, 1-ethylpiperazine, 1-octylpiperazine, aniline, anilines substituted in the ring by ($C_1$-$C_{22}$)-alkyl and/or ($C_1$-$C_{22}$)-alkoxy, such as o-, m- and p-toluidine, o-, m- and p-anisidine, o-, m- and p-phenetidine, 2-naphthylamine, 2,3-, 2,4-, 2,5-, 2,6-xylidine, 4-hexylaniline, 4-octylaniline, 4-decylaniline, 4-butoxyaniline, N-methylaniline, N-hexyl-4-pentylaniline, N,N-dimethylaniline, diphenylamine, 4-methylpyridine, 4-octylpyridine, 4-vinylpyridine, 4-allylpyridine, 4-aminopyridine, quinoline, lepidine, quinaldine, perhydroazepine and perhydroazecine.

Dyes of the formula I containing $SO_3^{\ominus}M^{\oplus}$ groups in which M has a meaning other than $H^{\oplus}$, especially those dyes which are of low solubility in water, and more particularly those in which $M^{\oplus}$ is a quaternary ammonium or phosphonium cation, can also be obtained by first of all neutralizing $SO_3H$-containing compounds of the formula V to form soluble salts, for example water-soluble sodium salts, and then conducting a cation exchange, for example by adding compounds of the formula VIII

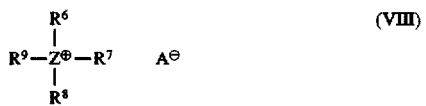

(VIII)

in which Z, $R^6$, $R^7$, $R^8$ and $R^9$ have the meanings given above for the formula IV, the cation being in particular a quaternary ammonium or phosphonium ion, and $A^{\ominus}$ is the anion of a strong or weak, inorganic or organic acid. The cation exchange is preferably conducted in an aqueous medium at a pH of from 4 to 9, preferably at a pH of from 5 to 7.

Examples of suitable quaternary salts of the formula VIII for the preparation of the corresponding dyes of the formula I by cation exchange are tetramethylammonium chloride, tetraethylammonium chloride, tetrapropylammonium bromide, tetrabutylammonium bromide, benzyl-tributylammonium chloride, benzyltriethylammonium chloride, benzyl-dimethyl-hexadecylammonium chloride, methyltrioctylammonium chloride, methyltridecylammonium chloride, dimethyldioctylammonium chloride, dimethyldidecylammonium chloride and -bromide, dimethyldihexadecyl-ammonium chloride, trimethyldodecylammonium chloride, trimethylhexadecylammonium chloride, trimethyloctadecylammonium chloride, tetrabutylphosphonium acetate, tributylhexadecylphosphonium bromide, benzyldodecylbis(2-hydroxyethyl)ammonium chloride, tetraoctylammonium chloride, dimethyldidodecyl-lammonium chloride, dimethyiditetradecyl-ammonium chloride, dimethyl-dioctadecylammonium chloride, dimethyldioleylammonium chloride, dimethyldi-coconut fatty ammonium chloride, dimethylbenzyl-coconut fatty alkylammonium chloride, methyltridodecylammonium chloride, trimethyldecylammonium chloride, trimethyldodecylammonium chloride, trimethyltetradecylammonium chloride, trimethyl-9-octadecenylammonium chloride, trimethyltallow fatty alkylammonium chloride, trimethyl-soya oil alkylammonium chloride, trimethyl-coconut fatty alkylammonium chloride, dimethylbenzyltetradecylammonium chloride, dimethylbenzyl-octadecylammonium chloride, dimethylbenzyltetradecylammonium bromide, dimethyldodecylbenzyl-ammonium chloride, benzyldioctyldodecylammonium chloride, 4-pentadecyl-N-methylpyridinium bromide, 4-heptadecyl-N-ethylpyridinium bromide, 4-tridecyl-N-propylpyridinium bromide, 4-tridecyl-N-allylpyridinium chloride, 4-(1-hexyldecyl)-N-butylpyridinium bromide, 4-(2-methyloctyl)-N-hexylpyridinium bromide, 4-ethyl-N-octylpyridinium bromide, 4-hexyl-N-octylpyridinium bromide, 4-methyl-N-hexadecylpyridinium chloride, N-octylpyridinium bromide, N-(2-ethylhexyl)pyridinium bromide, N-dodecylpyridinium chloride, N-hexadecylpyridinium bromide and chloride, N-hexadecylpyridinium hydrogen sulfate, N-octadecylpyridinium p-toluenesulfonate, 2-tridecyl-N-butylpyridinium bromide, 2-heptyl-N-(2-methyloctyl) pyridinium bromide, 2-pentyl-N-decylpyridinium bromide, 2-methyl-N-dodecylpyridinium bromide, 2,6-dimethyl-N-dodecylpyridinium bromide, 2-methyl-5-ethyl-N-hexadecylpyridinium bromide, tributyltetradecylphosphonium chloride, dimethylbenzyldodecyl-phosphonium chloride, trimethyl-tetradecylphosphonium chloride, trimethylhexadecylphosphonium chloride, dimethylbenzyloctadecylphosphonium chloride, tributyl-coconut fatty alkylphosphonium chloride, polydiallyldimethylammonium chloride, and 3-benzyl-5-(2-hydroxyethyl)-4-methylthiazolium chloride.

By the choice of the cation or cations $M^{\oplus}$ which is or are introduced into the compounds of the formula I through the neutralization of $SO_3H$ groups or through cation exchange it is possible to vary within wide limits the properties of the novel dyes, especially, for instance, their solubility in various solvents such as in water or organic solvents, and to adapt these properties to the envisaged end use. Thus, for example, dyes of low solubility in water, which are suitable for the preparation of inks based on organic solvents or for hot-melt systems, can be obtained by neutralizing $SO_3H$ groups with amines containing more than 6 carbon atoms.

In order to obtain novel benzothioxanthene dyes of the formula I containing $SO_2NR^4R^5$ groups, $SO_2Cl$ groups present in compounds of the formula V, which have been introduced into compounds of the formula III by, for example, reaction with chlorosulfonic acid, chlorosulfonic acid/thionyl chloride or sulfuryl chloride, can be converted to sulfonamide groups by reaction with ammonia and/or primary and/or secondary amines of the formula VI.

in which $R^4$ and $R^5$ have the meanings given above for the formula I. The sulfonamide formation is expediently carried out in a manner familiar to the skilled worker in the presence of a solvent or solvent mixture, for example in water or in an inert organic solvent, and takes place normally at from −10° C. to 100° C., preferably from 0° C. to 40° C. Depending on the individual case it may also be favorable to add acylation catalysts or emulsifiers or dispersants in the course of aminolysis of the $SO_2Cl$ groups, in the case, for example, of reaction with higher amines, of poor solubility in water, in water as reaction medium. It is often expedient to carry out the sulfonamide formation in a specific pH range, again dependent on the individual case, in many cases preferably at a pH of from 7 to 14, particularly preferably at a pH of from 7.5 to 10. It may also be favorable to add an inert auxiliary base, such as sodium hydroxide solution, during the aminolysis.

Examples of amines which can be used to convert $SO_2Cl$ groups in compounds of the formula V are ammonia, methylamine, ethylamine, propylamine, isopropylamine, n-butylamine, isobutylamine, sec-butylamine, n-pentylamine, isopentylamine, n-hexylamine, isoheptylamine, n-octyl-amine, tert-octylamine, 2-ethylhexylamine, 3-(2-ethylhexoxy)propylamine, nonylamine, dodecylamine, hexadecylamine, stearylamine, coconut fatty amine, cyclohexylamine, dimethylamine, diethylamine, ethanolamine, diethanolamine, allylamine, 3-dimethylaminopropylamine, 1-amino-2,3-dihydroxypropane, ethylenediamine, 1,3-diaminopropane, diethylene-triamine, triethylenetetramine, pyrrolidine, piperidine, morpholine, 4-methyl-piperidine, 4-hexylpiperidine, benzylamine, aniline, anilines substituted in the ring by $(C_1-C_{22})$-alkyl and/or $(C_1-C_{22})$-alkoxy, for example o-, m-, p-toluidine, o-, m-, p-anisidine, o-, m-, p-phenetidine, 4-hexylaniline, 4-decylaniline, 4-butoxyaniline, N-methylaniline, N-ethylaniline, 2-aminopyridine, 4-aminopyridine, 2-aminoimidazole, 2-aminothiazole, 2-amino-benzimidazole, 5-aminobenzimidazolone, di-n-butylamine, di-isononyl-amine, distearylamine, dicyclohexylamine, and also amino acids, for example glycine, valine, alanine, serine, cysteine, aspartic acid, asparagine, glutamic acid, glutamine, lysine, ornithine, phenylalanine, histidine, proline, tyrosine, arginine.

To prepare novel benzothioxanthene dyes of the formula I containing at the same time $SO_2NR^4R^5$ groups and $SO_3^\ominus M^\oplus$ groups it is possible, for example, to start from compounds of the formula V which simultaneously contain $SO_2Cl$ groups and $SO_3H$ groups. In such compounds it is possible, as explained above, to convert the $SO_2Cl$ groups to $SO_2NR^4R^5$ groups and, at the same time or subsequently, to convert the $SO_3H$ groups to $SO_3^\ominus M^\oplus$ groups by neutralization with an added base and/or by cation exchange.

Where the compounds of the formula I contain carboxyl or sulfo groups in the radicals $R^4$ and/or $R^5$, then these groups can be converted into salts for transformation of $SO_3H$ groups to $SO_3^\ominus M^\oplus$ groups, in accordance with the comments above, and can also be transformed into the salts simultaneously in the course of the conversion of $SO_3H$ groups represented by $R^{1a}$, $R^{2a}$, $R^{3a}$. Depending on the envisaged end use, however, it is also possible—by establishing a defined pH which is dependent on the acid strength of the particular group—to obtain compounds comprising free acid groups.

The novel benzothioxanthene dyes of the formula I can be isolated from the reaction mixture produced in the course of generating the $SO_2NR^4R^5$ and/or $SO_3^\ominus M^\oplus$ groups in accordance with customary methods, to be guided by the particular individual case. Dyes of low solubility in the reaction medium, for example water, can be isolated in a simple manner, for example by filtration or centrifugation, and can be purified by washing; for example, dyes of low solubility in water can be washed free from unwanted salts with water. If a solution of the dye is obtained, for example an aqueous solution in the case of the neutralization of the $SO_3H$ groups in water, then the dye can, for example, be precipitated by adding a precipitant or can be isolated in solid form by concentrating or drying the solution, for example by spray drying, and can be used, for example, in the preparation of recording liquids or subjected to a purifying operation. Solutions of the dye that are obtained, however, especially aqueous solutions, can also be processed further directly, e.g. used for the preparation of recording liquids, in which case the dye solutions are generally also subjected to microfiltration in order to remove insoluble particles and/or to dialysis or ultrafiltration in order to remove inorganic salts.

Through the choice of the substituents $R^1$, $R^2$, $R^3$, $R^4$ and $R^5$ and of the cation or cations $M^\oplus$ and the number n it is possible to vary the properties of the novel dyes of the formula I within wide limits and to orient them in accordance with the envisaged end use. It is possible in particular, as already stated, to vary the solubility properties through the choice of $M^\oplus$ and also $R^4$ and $R^5$. By introducing lipophilic radicals it is possible to obtain dyes which are of low solubility in water but good solubility in relatively strongly lipophilic organic solvents, and through the introduction of hydrophilic radicals and groups in salt form it is possible to obtain dyes which are of good solubility in water and in relatively strongly hydrophilic organic solvents. Dyes which are soluble in water and in water-miscible solvents generally have at least one $SO_3^\ominus M^\oplus$ group or a $COO^\ominus M^\oplus$ group with a hydrophilic cation in the radicals $R^1$, $R^2$, $R^3$ or in the radicals $R^4$ and $R^5$.

The novel benzothioxanthene dyes of the formula I are outstandingly suitable for dyeing and printing natural and synthetic fiber materials, for example textile materials produced from cotton, nylon or wool, and for coloring paper and plastics, for example polystyrene. Prints or dyeings produced on these materials with dyes according to the invention are notable for high color strength and brilliance and for good fastness properties, in particular an excellent light fastness.

In addition, however, the soluble novel dyes of the formula I are suitable with particular excellence for preparing inks and recording liquids, especially those for the inkjet process and those containing water as solvent, or mixtures of water and organic solvents, and those containing only organic solvents, and are also suitable for hot-melt systems based on waxlike products, for example corresponding fatty alcohols or arylsulfonamides. Compared with the red dyes used for this purpose in the prior art, of the C.I. Acid Red 249 type of the formula II indicated above, the novel dyes are distinguished in particular by a substantially enhanced light fastness. As a result of their high light fastness and document fastness and their high color strength, they are markedly superior to the red dyes previously used for multicolor printing. In addition, the novel dyes also have advantages over their prior-art counterparts from a toxicological standpoint and in terms of temperature stability.

Inks and recording liquids and also hot-melt compositions comprising one or more dyes of the formula I, especially when used in the inkjet printing process, give red printed images of excellent standard, possessing very good definition and brilliance and also high light fastness, water resistance and abrasion resistance. When inks and recording liquids prepared using soluble dyes of the formula I are stored, even for prolonged periods, there is no deposition of crystals, which can lead to blocking of nozzles and to printed images lacking in definition. The present invention thus additionally provides recording liquids, especially for the inkjet printing process, which comprise one or more soluble dyes of the formula I; hereinbelow, the term recording liquids is to be interpreted as referring also to the marking and writing liquids known as inks. The present invention additionally provides hot-melt compositions, especially those based on waxlike products, which comprise one or more dyes of the formula I. Examples of waxlike products which can be employed are fatty alcohols or fatty acids having 18–24 carbon atoms, or arylsulfonamides, for example 3-methyl- and 4-methyl-benzenesulfonamide. Details on hot-melt systems can be found, for example, in P. Gregory, High-Technology Applications of Organic Colorants, Plenum Press, p. 182 and pp. 201–202 (1991).

The novel recording liquids are prepared by methods familiar to the skilled worker; their particular composition is guided by the intended end use. The finished recording liquids generally comprise a total of from 0.5 to 15% by weight (calculated on dry basis) of one or more soluble dyes of the formula I, from 0 to 99% by weight of water and from 0.5 to 99.5% by weight of solvents and/or moisture retention agents. In a preferred embodiment, the finished recording liquids comprise from 0.5 to 15% by weight of dye (calculated on dry basis), from 40 to 85% by weight of water and from 10 to 50% by weight of solvents and/or moisture retention agents; in another preferred embodiment they comprise from 0.5 to 15% by weight of dye (calculated on dry basis), from 0 to 20% by weight of water and from 70 to 99.5% by weight of solvent and/or moisture retention agents. The finished recording liquids generally also include further additives, which are mentioned below.

Water used to prepare the recording liquids is preferably in the form of distilled or deionized water. The solvent and/or moisture retention agent present in the recording liquids may be a single organic solvent or else a mixture of such solvents. In one preferred embodiment, water-soluble solvents are employed; in another, more lipophilic solvents. Examples of suitable solvents are mono- and polyhydric alcohols, their ethers and esters, for example alkanols, especially having 1 to 4 carbon atoms, such as, for example, methanol, ethanol, propanol, isopropanol, butanol, isobutanol, tert-butanol; dihydric and trihydric alcohols, especially those having 2 to 6 carbon atoms, for example ethylene glycol, propylene glycol, 1,3-propanediol, 1,4-butanediol, 1,5-pentanediol, 1,6-hexanediol, 1,2,6-hexanetriol, glycerol, diethylglycol, dipropylene glycol; polyalkylene glycols, for example triethylene glycol, polyethylene glycol, tripropylene glycol, polypropylene glycol; lower alkyl ethers of polyhydric alcohols, for example ethylene glycol monomethyl, monoethyl, monopropyl, monobutyl ether, diethylene glycol monomethyl, monoethyl ether, triethylene glycol monomethyl, monoethyl ether; phenylglycol; ketones and keto alcohols, especially those having 3 to 7 carbon atoms, for example acetone, methyl ethyl ketone, diethyl ketone, methyl isobutyl ketone, methyl pentyl ketone, cyclopentanone, cyclohexanone, diacetone alcohol; ethers, for example dibutyl ether, tetrahydrofuran, dioxane; esters, for example ethyl formate, methyl formate, methyl acetate, ethyl acetate, propylene acetate, butyl acetate, phenyl acetate, ethylene glycol monoethyl ether acetate, 2-hydroxyethyl acetate; amides, for example dimethylformamide, dimethylacetamide, N-methylpyrrolidone; and also ureas, tetramethylurea, thiodiglycol.

Among the abovementioned substances, some act not only as solvents but also exhibit other properties. Thus, for example, the polyhydric alcohols also act as moisture retention agents.

The recording liquids can, furthermore, include customary additives, examples being preservatives, such as phenol derivatives, for example, cationic, anionic or nonionic surface-active substances (wetting agents), and also agents for regulating the viscosity, for example polyvinyl alcohol, cellulose derivatives, or water-soluble natural or synthetic resins as film formers or binders for increasing the adhesion and the abrasion resistance.

Amines, such as ethanolamine, diethanolamine, triethanolamine, N,N-dimethylethanolamine, diisopropylamine, for example, serve predominantly to increase the pH of the recording liquid. They are generally present in the recording liquid in a proportion of from 0 to 10% by weight, preferably from 0.5 to 5% by weight.

In recording liquids for the inkjet printing process it is possible, depending on the embodiment of this printing process, for example as a continuous jet, intermittent jet, impulse jet or compound jet process, to add—if desired— still further additives, for example for buffering the pH or for adjusting the electrical conductivity, the specific heat and the thermal expansion coefficient.

The recording liquids can be prepared in a simple manner by mixing the components, which can be carried out, for example, by dissolving one or more dyes of the formula I in water and/or solvents, or else by diluting to the desired extent an aqueous solution obtained in the preparation of the dye of the formula I, either as it is or after appropriate preparation, and then mixing in further components, such as water, solvents, additives, etc.

The recording liquids comprising one or more dyes of the formula I are outstandingly suitable for use in printing, copying, marking, writing, signing, stamping or recording processes, but especially in the inkjet printing process. In this application, prints of high quality are obtained which possess high definition and brilliance and also good light fastness, water resistance and abrasion resistance. They are also advantageous on toxicological grounds.

When novel recording liquids or inks are stored there is no deposition of precipitates; moreover, during inkjet printing using the novel inks, there is no blockage of the nozzles. There are also no alterations to the physical properties of novel recording liquids or inks when they are employed in an inkjet printer for prolonged periods with continual recirculation or intermittently, with the inkjet printer being switched off in between uses.

EXAMPLES

The contents indicated are in percent by weight.

Example 1
Sulfonation of C.I. Solvent Orange 63

336.0 g of C.I. Solvent Orange 63 (compound of the formula III where X=Y=hydrogen) are introduced over the course of 1 hour into 1280 g of chlorosulfonic acid. The reaction mixture is subsequently heated to 120° C. over the course of 1 hour, stirred at 120° C. for 3 hours and then cooled to 20° C. To isolate the product, the resulting sulfochlorination mixture is metered over 1 hour into a mixture of 1.0 l of water and 3.0 kg of ice, and a further 9.0 kg of ice are added in portions in order to maintain the precipitation temperature of 0°–5° C. The precipitated sulfochlorination product of the formula V where $R^{1a}$=$SO_2Cl$, $R^{2a}$=$SO_3H$, $R^3$=X=Y=hydrogen and n=0 is filtered off and washed with 2.0 l of ice-water.

Yield: 1821.0 g of filter cake; dry content 28.3%.

Example 2

Dye of the formula I where $R^1$=$R^2$=$SO_3^{\ominus}NH_4^{\oplus}$, $R^3$=X=Y=hydrogen and n=0

1821.0 g of the filter cake obtained in Example 1 are introduced into 5.0 l of water, and the mixture is heated at 100° C. with stirring for 2 hours. The resulting acidic solution of the dye of the formula V where $R^{1a}$=$R^{2a}$=$SO_3H$, $R^{3a}$=X=Y=hydrogen, and n=0 is subsequently cooled to 20° C. and adjusted to a pH of 7.5 using 345.6 g of 25% strength aqueous ammonia. Removal of inorganic salts by ultrafiltration and evaporative concentration of the salt-free solution gives 521.5 g of a red dye powder.

Absorption spectrum in water: $\lambda_{max}$=519 nm

The resulting dye of the formula I where $R^1$=$R^2$=$SO_3^{\ominus}NH_4^{\oplus}$, $R^3$=X=Y=hydrogen and n=0 is notable for very good solubility, high brilliance and color strength, good water fastness and excellent light fastness.

Example 3

Dye of the formula I where $R^1$=$SO_2NH_2$, $R^2$=$SO_3^{\ominus}Li^{\oplus}$, $R^3$=X=Y=hydrogen and n=0

The sulfonation of 336.0 g of C.I. Solvent Orange 63 is carried out in accordance with the details in Example 1. 1821.0 g of the resulting sulfochloride paste are introduced at 0°–5° C. into a mixture of 3 l of water and 750 g of ice, and the mixture is adjusted to a pH of 6 using 72.0 g of 50% aqueous sodium hydroxide solution. Then 813.0 g of a 25% strength aqueous ammonia solution and 6 l of water are added in portions, and the mixture is stirred at 40° C. for 1 hour. A solution of 81.1 g of lithium hydroxide monohydrate in 350 ml of water is subsequently added to the reaction mixture. Removal of inorganic salts by membrane filtration and drying of the salt-free solution gives 510.5 g of a red dye powder.

Absorption spectrum in water: $\lambda_{max}$=507 nm

The resulting dye of the formula I where $R^1$=$SO_2NH_2$, $R^2$=$SO_3^{\ominus}Li^{\oplus}$, $R^3$=X=Y=hydrogen and n=0 is of high color strength and brilliance and has good water fastness and excellent light fastness.

Example 4

Dye of the formula I where $R^1$=$R^2$=$SO_3^{\ominus}(C_{12}H_{25}$—$C_{14}H_{29})NH_3^{\oplus}$, $R^3$=X=Y=hydrogen and n=0

The sulfonation of 336.0 g of C.I. Solvent Orange 63 is carried out in accordance with the details in Example 1. 1821.0 g of the resulting filter cake are introduced in 5 l of water and the mixture is heated at 100° C. for 2 hours and then cooled to 20° C. It is subsequently adjusted to a pH of 6 using 448.0 g of 50% strength aqueous sodium hydroxide solution, and to the resulting neutralized solution of the dye of the formula I where $R^1$=$R^2$=$SO_3^{\ominus}Na^{\oplus}$, $R^3$=X=Y=hydrogen and n=0 there is added a solution of 458.4 g of Primen 81 R (technical-grade amine mixture of tertiary $(C_{12}$–$C_{14})$-alkylamines; manufacturer: Rohm and Haas) in 1.8 l of water and 278.3 g of 32% strength aqueous hydrochloric acid. The precipitated product is isolated by filtration, washed with 3.0 l of water and dried under reduced pressure at 70° C.

Yield: 856.0 g of dark red powder.

Absorption spectrum in ethanol: $\lambda_{max}$=519 nm

The resulting dye of the formula I where $R^1$=$R^2$=$SO_3^{\ominus}$ $(C_{12}H_{25}$—$C_{14}H_{29})NH_3^{\oplus}$, $R^3$=X=Y=hydrogen and n=0 is notable for a high brilliance and color strength and for excellent light fastness. Solutions of the dye in ethanol, isopropanol, ethylene glycol, diethylene glycol, polyethylene glycol, propylene glycol, dipropylene glycol, methylglycol, butylglycol, phenylglycol, dimethylformamide and N-methyl-pyrrolidone are suitable as inkjet inks and recording liquids. The dye is likewise suitable for hot-melt systems based on waxlike products, for example fatty alcohols and fatty acids having 18–24 carbon atoms and arylsulfonamides such as 3-methyl- and 4-methylbenzenesulfonamide.

Example 5

Dye of the formula I where $R^1$=$R^2$=$SO_2NHCH_2CH(C_2H_5)C_4H_9$, $R^3$=X=Y=hydrogen and n=0

The reaction of 33.6 g of C.I. Solvent Orange 63 with 128.0 g of chlorosulfonic acid is carried out in accordance with the details in Example 1. After carrying out the chlorosulfonic acid reaction at 120° C., the reaction mixture is cooled to 75° C., and 23.8 g of thionyl chloride are added over the course of 2 hours. The mixture is then stirred at 85° C. for 4 hours until the evolution of gas comes to an end, and then cooled to 20° C. The resulting solution of the dye of the formula V where $R^{1a}$=$R^{2a}$=$SO_2Cl$, $R^3$=X=Y=hydrogen and n=0 in chlorosulfonic acid is then slowly added to a mixture of 100 ml of water and 300 ml of ice, the precipitation temperature being maintained at 0°–5° C. by addition of a further 900 g of ice. The precipitated product is isolated by filtration and washed with 400 ml of 5% strength sodium chloride solution at 5° C. The resulting filter cake is then added over the course of 30 minutes to a mixture of 38.4 g of 2-ethylhexylamine, 0.5 g of Emulgator WN flüssig (technical-grade dispersant; manufacturer: Bayer AG), 80 ml of water and 80 g of ice. The mixture is subsequently stirred at 50° C. for 3 hours, during which the pH of the reaction mixture is maintained at 9–9.5 by addition of 23.2 g of 50% strength aqueous sodium hydroxide solution. The dye is subsequently isolated by filtration, washed with 1 l of water to free it from electrolyte, and dried under reduced pressure at 70° C.

Yield: 78.0 g of dark red powder.

Absorption spectrum in dimethylformamide: $\lambda_{max}$=521 nm

The resulting dye of the formula I where $R^1$=$R^2$=$SO_2NHCH_2CH(C_2H_5)C_4H_9$, $R^3$=X=Y=hydrogen and =0 is outstandingly suitable for the coloring of plastics, for example polystyrene, in brilliant red shades, which are distinguished by excellent light fastness.

The table below lists further examples of novel dyes of the formula I which are obtained in accordance with the examples above. The table indicates $R^1$, $R^2$, $R^3$, X, Y and n, the absorption maximum $\lambda_{max}$ of the dye in nm, and the solvent LM in which the absorption spectrum was measured.

| Example | R¹ | R² | R³ | X | Y | n | λ_max [nm] | LM |
|---|---|---|---|---|---|---|---|---|
| 6 | SO$_2$NHCH$_2$CO$_2^{\ominus}$Na$^{\oplus}$ | SO$_2$NHCH$_2$CO$_2^{\ominus}$Na$^{\oplus}$ | H | H | H | 0 | 511 | a) |
| 7 | SO$_2$NH(CH$_2$)$_4$CH(NH$_2$)CO$_2^{\ominus}$Li$^{\oplus}$ | SO$_3^{\ominus}$Li$^{\oplus}$ | H | H | H | 0 | 519 | a) |
| 8 | SO$_2$NH(CH$_2$)$_3$N(CH$_3$)$_2$ | SO$_3^{\ominus}$Li$^{\oplus}$ | H | H | H | 0 | 506 | a) |
| 9 | SO$_2$NH$_2$ | SO$_3^{\ominus}$Na$^{\oplus}$ | SO$_3^{\ominus}$Na$^{\oplus}$ | H | H | 0 | 503 | a) |
| 10 | SO$_3^{\ominus}$H$_3$N(C$_2$H$_5$)$^{\oplus}$ | SO$_3^{\ominus}$H$_3$N(C$_2$H$_5$)$^{\oplus}$ | H | H | H | 0 | 519 | a) |
| 11 | SO$_3^{\ominus}$H$_3$N(C$_4$H$_9$)$^{\oplus}$ | SO$_3^{\ominus}$H$_3$N(C$_4$H$_9$)$^{\oplus}$ | H | H | H | 0 | 520 | a) |
| 12 | SO$_3^{\ominus}$HN(C$_2$H$_5$)$_3^{\oplus}$ | SO$_3^{\ominus}$HN(C$_2$H$_5$)$_3^{\oplus}$ | H | H | H | 0 | 519 | a) |
| 13 | SO$_3^{\ominus}$N(C$_4$H$_9$)$_4^{\oplus}$ | SO$_3^{\ominus}$N(C$_4$H$_9$)$_4^{\oplus}$ | H | H | H | 0 | 519 | b) |
| 14 | SO$_3^{\ominus}$HN(CH$_2$CH$_2$OH)$_3^{\oplus}$ | SO$_3^{\ominus}$HN(CH$_2$CH$_2$OH)$_3^{\oplus}$ | H | H | H | 0 | 518 | a) |
| 15 | SO$_3^{\ominus}$H$_3$N(C$_{22}$H$_{45}$)$^{\oplus}$ | SO$_3^{\ominus}$H$_3$N(C$_{22}$H$_{45}$)$^{\oplus}$ | H | H | H | 0 | 519 | b) |
| 16 | SO$_2$N(CH$_2$CH$_2$OH)$_2$ | SO$_2$N(CH$_2$CH$_2$OH)$_2$ | H | H | H | 0 | 517 | c) |
| 17 | SO$_2$NHCH(CO$_2^{\ominus}$Na$^{\oplus}$)CH$_2$CH$_2$—CO$_2^{\ominus}$Na$^{\oplus}$ | SO$_3^{\ominus}$Na$^{\oplus}$ | H | H | H | 0 | 515 | a) |
| 18 | SO$_3^{\ominus}$H$_2$N(CH$_2$CH$_2$OH)$_2^{\oplus}$ | SO$_3^{\ominus}$Na$^{\oplus}$ | H | H | H | 0 | 518 | a) |
| 19 | SO$_3^{\ominus}$NH$_4^{\oplus}$ | SO$_3^{\ominus}$NH$_4^{\oplus}$ | H | 9-Br | H | 0 | 527 | a) |
| 20 | SO$_3^{\ominus}$Na$^{\oplus}$ | SO$_3^{\ominus}$Na$^{\oplus}$ | H | H | 4-CH$_3$ | 0 | 525 | a) |
| 21 | SO$_3^{\ominus}$Na$^{\oplus}$ | SO$_3^{\ominus}$Na$^{\oplus}$ | H | H | H | 1 | 503 | a) |
| 22 | SO$_3^{\ominus}$Na$^{\oplus}$ | SO$_3^{\ominus}$Na$^{\oplus}$ | H | H | H | 2 | 501 | a) | a) Water, b) Dimethylformamide, c) Ethanol

Example 23
Recording liquid

By mixing the components, a recording liquid having the following composition is prepared:
4.0% by weight of dye of example 2
2.0% by weight of triethanolamine
10.0% by weight of diethylene glycol
5.0% by weight of N-methylpyrrolidone
79.0% by weight of water

We claim:

1. A benzothioxanthene dye of the formula I

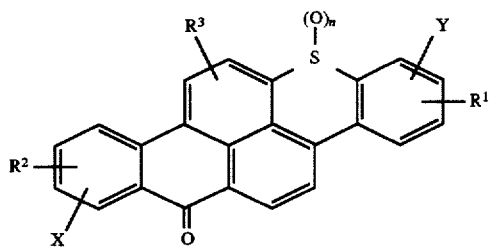

in which

R$^1$ is SO$_3^{\ominus}$M$^{\oplus}$ or SO$_2$NR$^4$R$^5$;

R$^2$ and R$^3$ independently of one another are hydrogen, SO$_3^{\ominus}$M$^{\oplus}$ or SO$_2$NR$^4$R$^5$;

R$^4$ is hydrogen, (C$_1$–C$_{22}$)-alkyl, (C$_3$–C$_7$)-cycloalkyl, aryl, heteroaryl, aryl-(C$_1$–C$_6$)-alkyl, hydroxy-(C$_1$–C$_4$)-alkyl or carboxy-(C$_1$–C$_4$)-alkyl;

R$^5$ is hydrogen, (C$_1$–C$_{22}$)-alkyl, (C$_3$–C$_7$)-cycloalkyl, aryl-(C$_1$–C$_6$)-alkyl, hydroxy-(C$_1$–C$_4$)-alkyl, dihydroxy-(C$_1$–C$_4$)-alkyl, carboxy-(C$_1$–C$_4$)-alkyl, dicarboxy-(C$_1$–C$_6$)-alkyl, (amino)-(carboxy)-(C$_1$–C$_6$)-alkyl, sulfo-(C$_1$–C$_6$)-alkyl, amino-(C$_1$–C$_6$)-alkyl, (C$_1$–C$_4$)-alkylamino-(C$_1$–C$_6$)-alkyl, (di-((C$_1$–C$_4$)-alkyl) amino)-(C$_1$–C$_6$)-alkyl or the residue of an amino acid which is formally obtained by removing the amino group from the amino acid molecule, or R$^4$ and R$^5$, together with the nitrogen atom to which they are attached, form a 5- to 7-membered heterocyclic ring;

M$^{\oplus}$ is a cation;

X is hydrogen, chlorine or bromine;

Y is hydrogen, chlorine, (C$_1$–C$_4$)-alkyl or (C$_1$–C$_4$)-alkoxy; and n is 0, 1 or 2.

2. A benzothioxanthene dye of the formula I as claimed in claim 1, wherein the number of radicals R$^1$, R$^2$ and R$^3$ which are identical or different groups SO$_3^{\ominus}$M$^{\oplus}$ or SO$_2$NR$^4$R$^5$ is two or three.

3. A benzothioxantene dye of the formula I as claimed in claim 1, wherein X or Y is hydrogen.

4. A benzothioxanthene dye of the formula I as claimed in claim 1, wherein n is 0.

5. A benzothioxanthene dye of the formula I as claimed in claim 1, wherein R$^4$ is hydrogen, (C$_1$–C$_{22}$)-alkyl, hydroxy-(C$_1$–C$_4$)-alkyl or carboxy-(C$_1$–C$_4$)-alkyl and R$^5$ is hydrogen, (C$_1$–C$_{22}$)-alkyl, hydroxy-(C$_1$–C$_4$)-alkyl, carboxy-(C$_1$–C$_4$)-alkyl, dicarboxy-(C$_1$–C$_6$)-alkyl, (amino)-(carboxy)-(C$_1$–C$_6$)-alkyl, amino-(C$_1$–C$_6$)-alkyl, (C$_1$–C$_4$)-alkylamino-(C$_1$–C$_6$)-alkyl or (di-((C$_1$–C$_4$)-alkyl amino)-(C$_1$–C$_4$)-alkyl.

6. A benzothioxanthene dye of the formula I as claimed in claim 1, wherein M$^{\oplus}$ is ions of sodium, lithium, potassium, magnesium, calcium or barium, the unsubstituted ammonium ion or ions of the formula IV

in which

Z is nitrogen or phosphorus;

R$^6$, R$^7$, R$^8$ and R$^9$ independently of one another represent at least one of the following:

(C$_1$–C$_{22}$)-alkyl groups, which are optionally substituted by at least one hydroxyl group or 2-hydroxyethoxy group or combination thereof, and in which carbon atoms of any of said alkyl groups are optionally replaced once or more by oxygen atoms or nitrogen atoms and in which said (C$_1$–C$_{22}$)-alkyl groups are optionally interrupted by aryl units or substituted by aryl groups or interrupted by aryl units and substituted by aryl groups; or (C$_3$–C$_7$)-cycloalkyl groups, optionally substituted once or more by (C$_1$–C$_4$)-alkyl or hydroxyl groups or a combination thereof and in which carbon atoms of said cycloalkyl groups are optionally replaced once or more by oxygen or nitrogen atoms; or unsubstituted or mono- or polysubstituted aryl; or unsubstituted or mono- or polysubstituted heteroaryl; or —(CH$_2$—CH$_2$—O)$_r$—R$^{10}$, in which R$^{10}$ is hydrogen or (C$_1$–C$_4$)-alkyl and r is a number from 1 to 5; or hydrogen, if Z is nitrogen; or 2 or 3 of the radicals R$^6$, R$^7$, R$^8$, R$^9$, together with the atom Z to which they are attached, can form a heterocyclic ring system which can be unsaturated or saturated and optionally contain other hetero-groups or are optionally substituted or optionally contain other hetero-groups and are substituted.

7. A process for preparing a benzothioxanthene dye of the formula I as claimed in claim 1, which comprises converting a benzothioxanthene dye of the formula III,

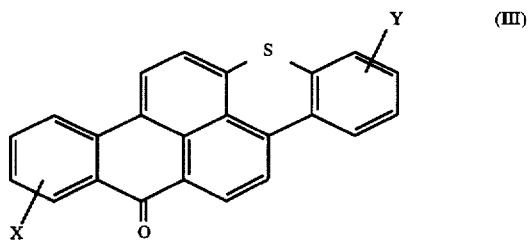

(III)

in which X and Y have the meanings given in claim 1 by sulfonation or chlorosulfonation and, optionally, subsequently transforming sulfonic acid groups to sulfochloride groups or transforming sulfochloride groups to sulfonic acid groups, and, optionally oxidizing the sulfur of said benzothioxanthene dye of formula III into compounds of the formula V

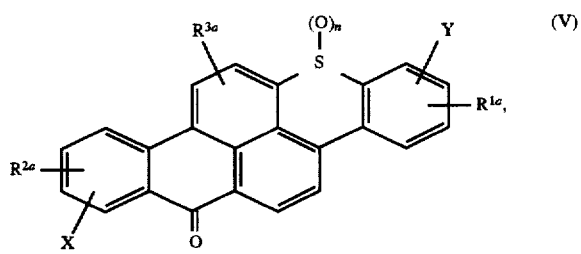

(V)

in which R$^{1a}$ is SO$_3$H or SO$_2$Cl, R$^{2a}$ and R$^{3a}$ independently of one another are hydrogen, SO$_3$H or SO$_2$Cl and X, Y and n have the meanings given in claim 1, and preparing compounds of the formula I from the compounds of the formula V by salt formation at SO$_3$H groups or by reaction of SO$_2$Cl groups with amines of the formula VI.

(VI)

in which R$^4$ and R$^5$ have the meanings given in claim 1.

8. A process as claimed in claim 7, wherein said benzothioxanthene dye of the formula I is formed in an aqueous solution, and the resulting aqueous solution is diluted and combined with a recording fluid additive or solvent to obtain a recording fluid.

9. A method for coloring a plastic or a fiber, comprising the step of printing upon or dyeing said plastic or fiber with a benzothioxanthene dye of the formula I of claim 1.

10. A hot-melt composition comprising a waxy material and at least one benzothioxanthene dye of the formula I of claim 1.

11. A hot-melt composition as claimed in claim 10, wherein said waxy material is a fatty acid, a fatty alcohol, an arylsulfonamide or a mixture thereof.

12. A method for inkjet printing comprising the step of spraying droplets of a hot-melt composition of claim 10 onto the substrate to be printed.

13. A recording fluid comprising at least one benzothioxanthene dye of the formula I of claim 1 dissolved in a solvent.

14. A recording fluid as claimed in claim 13, wherein said recording fluid comprises: 0.5 to 15%, calculated on a dry basis, of said benzothioxanthene dye of the formula I, the balance of said fluid comprising water, a lipophilic solvent, or a combination thereof.

15. A method for inkjet printing comprising the step of spraying droplets of a recording fluid of claim 13 onto the substrate to be printed.

* * * * *